United States Patent
Isenhour et al.

(10) Patent No.: US 9,410,637 B2
(45) Date of Patent: *Aug. 9, 2016

(54) VALVE ASSEMBLY

(71) Applicant: Extreme Technologies, LLC, Vernal, UT (US)

(72) Inventors: James D. Isenhour, Windsor, CO (US); Gilbert T. Meier, Vernal, UT (US)

(73) Assignee: Extreme Technologies, LLC, Vernal, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,148

(22) Filed: Apr. 7, 2015

(65) Prior Publication Data

US 2015/0211653 A1    Jul. 30, 2015

Related U.S. Application Data

(63) Continuation of application No. 13/940,487, filed on Jul. 12, 2013, now Pat. No. 9,010,370.

(60) Provisional application No. 61/670,687, filed on Jul. 12, 2012.

(51) Int. Cl.
| | |
|---|---|
| F16K 11/074 | (2006.01) |
| F16K 3/08 | (2006.01) |
| F16K 25/00 | (2006.01) |
| F16K 31/04 | (2006.01) |
| F16K 3/30 | (2006.01) |
| E21B 47/18 | (2012.01) |
| F15B 13/04 | (2006.01) |
| F16K 31/44 | (2006.01) |

(52) U.S. Cl.
CPC .............. *F16K 31/043* (2013.01); *E21B 47/187* (2013.01); *F15B 13/0406* (2013.01); *F16K 3/08* (2013.01); *F16K 3/30* (2013.01); *F16K 11/074* (2013.01); *F16K 25/005* (2013.01); *F16K 31/44* (2013.01); *Y10T 137/86533* (2015.04)

(58) Field of Classification Search
CPC .............. F16K 11/0655; F16K 11/076; F16K 11/1756; F16K 11/0743; F16K 3/085; F16K 3/10; F16K 25/005; F16K 31/043; F16K 3/30; F16K 3/08; F16K 31/44; Y10T 137/86533; E21B 47/187; F15B 13/0406
USPC ........ 251/369, 175, 188; 137/625.11–625.15, 137/625.46, 637.3, 614.11, 614.1, 625
See application file for complete search history.

(56) References Cited

U.S. PATENT DOCUMENTS

| | | | | |
|---|---|---|---|---|
| 3,116,757 | A * | 1/1964 | Donguy | F16K 11/06 137/625.11 |
| 4,921,015 | A * | 5/1990 | Sedy | F16K 11/074 137/625.11 |
| 5,372,351 | A * | 12/1994 | Oliver | F16K 31/055 251/129.03 |
| 6,257,279 | B1 * | 7/2001 | Peltz | F16K 11/074 137/625 |
| 6,607,371 | B1 * | 8/2003 | Raymond | F01C 1/34 418/11 |
| 6,973,974 | B2 * | 12/2005 | McLoughlin | E21B 23/006 166/320 |
| 7,793,940 | B2 * | 9/2010 | Martin | F16J 15/3496 277/370 |
| 2007/0028971 | A1 * | 2/2007 | Wagner | B01D 53/0446 137/625.15 |
| 2011/0247359 | A1 * | 10/2011 | Pawlik | F16K 11/074 62/511 |

* cited by examiner

*Primary Examiner* — Marina Tietjen
(74) *Attorney, Agent, or Firm* — Remenick PLLC

(57) ABSTRACT

A rotary valve is disclosed. The valve comprises a drive shaft, a rotor coupled to the drive shaft, a least one bearing surface coupled to the rotor, a stator adjacent to the rotor, at least one solid bearing surface coupled to the stator, and at least one ring bearing surface coupled to the stator.

11 Claims, 2 Drawing Sheets

VALVE ASSEMBLY

REFERENCE TO RELATED APPLICATIONS

This application is a continuation of U.S. Non-Provisional application Ser. No. 13/940,487, filed Jul. 12, 2013, entitled "Valve Assembly," which claims priority to U.S. Provisional Application No. 61/670,687, filed Jul. 12, 2012, entitled "Valve Assembly," both of which are hereby specifically and entirely incorporated by reference.

BACKGROUND

1. Field of the Invention

The invention is directed to valves, specifically, the invention is directed to rotary valves.

2. Background of the Invention

Rotary valves are used in industry for a number of applications like controlling the flow of liquids to molds, regulating the flow of hydraulic fluids to control various machine functions, industrial process control, and controlling fluids which are directed against work pieces. The vast majority of these applications are conducted at low fluid pressures and at either low rotational speeds or through an indexed movement. These applications have been addressed through application of various known fluid regulation valve applications including gate valves, ball valves, butterfly valves, rotating shafts with various void designs and configurations, solenoid actuated valves of various designs, and valves designed with disks with multiple holes to redirect flow streams. These applications are generally acceptable for low speed, low pressure processes, but are not suitable for high speed, high pressure processes.

For example, solenoid valves are effective for regulating fluid flow up to a frequency of approximately 300 Hz at a pressure of up to 200 psi. These limitations are primarily due to the physical design of the solenoid which relies upon the reciprocating motion of magnetic contacts and is therefore subject to significant acceleration and deceleration forces, particularly at higher frequencies. These forces, the resulting jarring action, and the frictional heat generated make these type valves subject to failure at high frequencies of actuation.

Rotary valves employing multiple outlets have been used at frequencies up to 1000 Hz in applications where a low pressure differential between valve inlet and outlet ports is desired. These valves, however, are large and complex and necessarily have significant physical space requirements for the valve and for the appurtenant inlet and outlet piping.

Other types of valves have disadvantages that include: the valve actuation cycle speed (frequency) of the valve is too low, the valve is large and physically complex, the valve creates significant head loss, the valve cannot satisfactorily operate at high inlet pressures, or the valve cannot create the necessary frequency or amplitude of flow perturbation.

For the foregoing reasons, there is a need for a high-speed, high pressure rotary valve for controlling the flow of a fluid to produce high frequency fluid pulses or perturbations. Further, there is a need for such a valve which is relatively simple in design, compatible with standardized piping systems, and suitable for high pressure applications with minimal head loss through the valve.

SUMMARY OF THE INVENTION

The present invention overcomes the problems and disadvantages associated with current strategies and designs and provides new tools and methods creating rotary valves.

One embodiment of the invention is directed to a rotary valve. The valve comprises a drive shaft, a rotor coupled to the drive shaft, a least one bearing surface coupled to the rotor, a stator adjacent to the rotor, at least one solid bearing surface coupled to the stator and at least one ring bearing surface coupled to the stator.

Preferably, during rotation, the at least one bearing surface coupled to the rotor slides across the at least one solid bearing surface and the at least one ring bearing surface. In the preferred embodiment the at least one bearing surface coupled to the rotor, the at least one solid bearing surface, and the at least one ring bearing surface are positioned at an equal distance from a rotational axis of the drive shaft. Preferably the at least one ring bearing surface is adapted to allow fluid to flow therethrough. Preferably the at least one bearing surface coupled to the rotor, the at least one solid bearing surface, and the at least one ring bearing surface are polycrystalline diamond compacts.

In the preferred embodiment, the at least one bearing surface coupled to the rotor and the at least one ring bearing surface form a seal between themselves when aligned. Preferably, the drive shaft is powered by fluid flowing through the rotary valve. Preferably, there are an equal number of bearing surfaces coupled to the rotor and ring bearing surfaces. Preferably, the rotor comprises at least two arms and the at least two arms are rotationally balanced. In the preferred embodiment, fluid passing through the rotary valve forces the rotor into contact with the stator.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is creating a high pressure, wear resistant rotary valve. It has been surprisingly discovered that by using low-friction stators and rotors, a rotary valve can be constructed that is wear resistant, capable of sealing at high pressures, can open and close at high speeds, and is unaffected by abrasive fluids.

Figure 1:
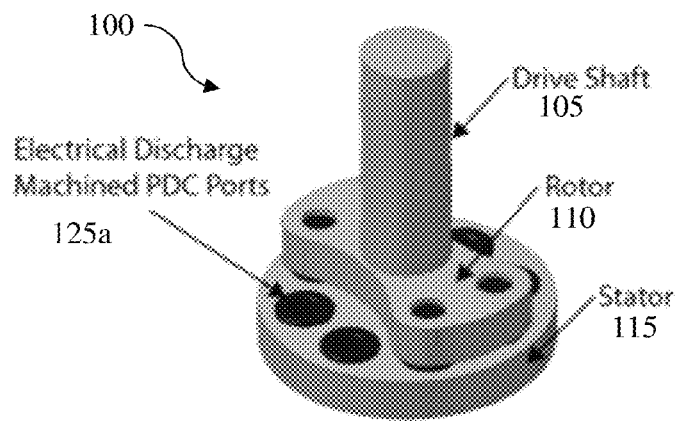
FIG. 1 is an isometric view of a rotary valve embodiment of the invention.

FIG. 1 depicts an embodiment of a rotary valve 100. Rotary valve 100 preferably comprises a drive shaft 105, a rotor 110 and a stator 115. In the preferred embodiment, drive shaft 105, rotor 110, and stator 115 are all made of the same corrosive resistant material, however each component can be of a different material, or combinations thereof. For example, drive shaft 105, rotor 110, and stator 115 can be made of steel, carbon steel, steel alloys, bronze, brass, copper, titanium, aluminum, aluminum alloys, plastics, combinations thereof, or other materials.

In the preferred embodiment drive shaft 105 and rotor 110 are rotationally coupled and rotate at the same rate, while stator 115 remains stationary. However, drive shaft 105 and stator 115 can be rotationally coupled while rotor 110 remains stationary. Drive shaft 105 is preferably coupled to a rotational force generator. The rotational force generator can be, for example, an electric, gas, or steam motor, an inductor, a turbine (e.g. a fluid turbine powered by liquid or gas), a hand crank, or another method of imparting rotational force to rotor 110. In the preferred embodiment, drive shaft 105 can rotate at speeds between 800 and 1200 rpm.

Preferably, rotor 110 extends, symmetrically from the center of drive shaft 105. Preferably, to keep the system in balance during rotation, the arms of rotor 110 extend in diametrically opposed directions from the center of drive shaft 105. While two arms are depicted in the figures, rotor 110 can have three, four, five, or another number of arms, or rotor 110 can be a disk or have another shape. Rotor 110 preferably has at least one solid bearing surface 120 coupled to each arm. As shown in the figures, each arm has two solid bearing surfaces 120, however another number of bearing surfaces 120 can be used. Bearing surfaces 120 extend from rotor 110 toward stator 115. In the preferred embodiment each bearing surface 120 is a polycrystalline diamond compact (PDC). However, each bearing surface 120 can be aluminum oxide, silicon carbide, cubic boron nitride, or another erosion and abrasion resistant material. Each bearing surface 120 is preferably 2 inches in diameter and all of the bearing surfaces 120 are preferably identical.

Stator 115 is preferably a disk with a plurality of bearing surfaces 125 projecting towards rotor 110, however stator 115 can have another shape. Stator 115 is preferably coaxial with drive shaft 105, however stator 115 can have a different axial arrangement. Preferably, stator 115 has a diameter equal to the inner diameter of a device into which valve 100 is placed. For example, if valve 100 is used in a drill string for downhole drilling, the diameter of stator 115 would be equal to the inner diameter of the body of the drill string. Having the diameter of stator 115 equal to the inner diameter of the device into which valve 100 is placed, insures that all of the fluid passes through valve 100.

Stator 115 has two types of bearing surfaces 125, ring bearing surfaces 125a and solid bearing surfaces 125b. In the preferred embodiment both ring bearing surfaces 125a and solid bearing surfaces 125b are made of the same material. Preferably, bearing surfaces 125 are made of PDC. However, other erosion and abrasion resistant materials can be used, for example aluminum oxide, silicon carbide, or cubic boron nitride. Preferably ring bearing surfaces 125a are identical to sold bearing surfaces 125b, however ring bearing surfaces 125a have their centers bored out. For example, the centers can be bored out using an electrical discharge machine (EDM). The holes (or nozzles) in the center of ring bearing surface 125a can be 1 inch in diameter, 1.25 inches in diameter, or another diameter depending on the demands of the fluids passing through the valve. Ring bearing surface 125a have the duel function of allowing fluid to pass through the valve and acting as a bearing surface between stator 115 and rotor 110. The figures show stator 115 having four solid bearing surfaces 125b and four ring bearing surfaces 125a. Another number of solid and ring bearing surfaces can be used as long as there is at least one ring bearing surface 125a. The ring bearing surface allows fluid to pass through valve 100.

In the preferred embodiment each bearing surface 120 and bearing surface 125 is positioned at the same distance from the axis of rotation of the drive shaft 105 so that the bearing surfaces 120 pass over the bearing surfaces 125 when the rotor 110 rotates. Preferably, there is an equal number of bearing surfaces 120 and ring bearing surfaces 125a, however there can be more or less bearing surfaces 120 than ring bearing surfaces 125a.

Figure 2:
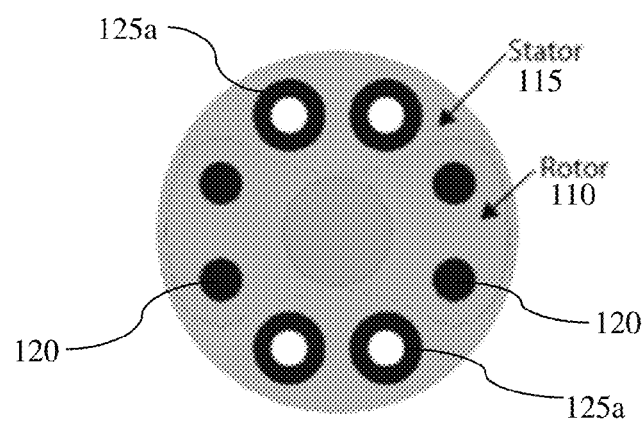
FIG. 2 is a view of an embodiment of the valve of the invention in the open position.
Figure 3:
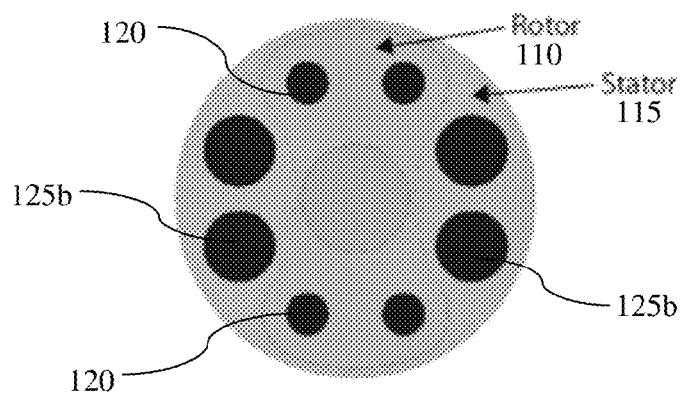
FIG. 3 is a view of an embodiment of the valve of the invention in the closed position.

As drive shaft 105 and rotor 110 rotate, bearing surfaces 120 move across bearing surfaces 125. During rotation, valve 100 moves from an open position (shown in FIG. 2), through intermediary positions, to a closed position (shown in FIG. 3). Preferably, when valve 100 is in the open position, fluid is able to pass through ring bearing surfaces 125a. When valve 100 is in the closed position, preferably bearing surfaces 120 create a seal with ring bearings surfaces 125a and do not allow fluid to pass through valve 100. In the embodiment show in the figures, at certain rotational positions, two of the ring bearing surfaces 125a are covered while two of the ring bearing surfaces 125a are uncovered. However, in other embodiments, where it is undesirable to have a semi-open position, the bearing surfaces can be arranged so that there is no rotational position where a portion of the ring bearing surfaces 125a are uncovered. Additionally, the bearing surfaces can be arranged such that there is always at least one ring bearing surface 125a that is uncovered. Additionally, bearing surfaces 120 can also be ring bearing surfaces such that the open position for valve 100 is when the ring bearing surfaces of rotor 110 and stator 115 align and the closed position for valve 100 is when the bearing surface of rotor 110 is aligned with the solid bearing surfaces of stator 115.

Figure 4:
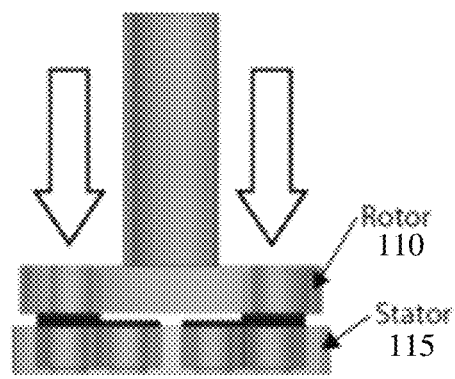
FIG. 4 is side view of an embodiment of the valve of the invention depicting the fluid pressure maintaining the valve seat.

In the preferred embodiment, rotor 110 is forced against stator 115 by the pressure of the fluid flowing through valve 100 (as shown in FIG. 4). The pressure of the fluid preferably maintains the valve seat, providing the necessary seals between bearing surface 120 and ring bearing surface 125a. In other embodiments, stator 100 is coupled to rotor 110. For example, stator 100 can be coupled to rotor 110 by a bolt, a bearing, friction, a cotter pin, or another fastener.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:
1. A rotary valve, comprising:
a drive shaft;
a rotor coupled to the drive shaft and having a rotor surface;
at least one solid bearing surface coupled to the rotor, extending from the rotor surface, and adapted to rotate about the drive shaft;

a stator adjacent to the rotor and having a stator surface, wherein the stator surface faces the rotor surface;

at least one solid bearing surface coupled to the stator and extending from the stator surface toward the rotor surface; and at least one ring bearing surface coupled to the stator and extending from the stator surface toward the rotor surface;

wherein the rotor comprises at least two arms and the at least two arms are rotationally balanced.

2. The rotary valve of claim 1, wherein, during rotation, the at least one solid bearing surface coupled to the rotor slides across the at least one solid bearing surface coupled to the stator and the at least one ring bearing surface.

3. The rotary valve of claim 1, wherein the at least one solid bearing surface coupled to the rotor, the at least one solid bearing surface, and the at least one ring bearing surface coupled to the stator are positioned at an equal distance from a rotational axis of the drive shaft.

4. The rotary valve of claim 1, wherein the at least one ring bearing surface is adapted to allow fluid to flow therethrough.

5. The rotary valve of claim 1, wherein the at least one solid bearing surface coupled to the rotor, the at least one solid bearing surface coupled to the stator, and the at least one ring bearing surface are polycrystalline diamond compacts.

6. The rotary valve of claim 1, wherein the at least one solid bearing surface coupled to the rotor and the at least one ring bearing surface form a seal between themselves when aligned.

7. The rotary valve of claim 1, wherein the drive shaft is powered by fluid flowing through the rotary valve.

8. The rotary valve of claim 1, wherein there are an equal number of solid bearing surfaces coupled to the rotor and ring bearing surfaces.

9. The rotary valve of claim 1, wherein fluid passing through the rotary valve forces the rotor into contact with the stator.

10. The rotary valve of claim 1, wherein a bore in the ring bearing surface is parallel to the drive shaft.

11. The rotary valve of claim 1, wherein the rotor and stator are coaxial.

* * * * *